United States Patent
Estlick et al.

(10) Patent No.: US 8,769,247 B2
(45) Date of Patent: Jul. 1, 2014

(54) PROCESSOR WITH INCREASED EFFICIENCY VIA EARLY INSTRUCTION COMPLETION

(75) Inventors: Michael D Estlick, Fort Collins, CO (US); Kevin Hurd, Fort Collins, CO (US); Jay Fleischman, Fort Collins, CO (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 405 days.

(21) Appl. No.: 13/088,096

(22) Filed: Apr. 15, 2011

(65) Prior Publication Data
US 2012/0265966 A1 Oct. 18, 2012

(51) Int. Cl.
*G06F 9/30* (2006.01)
(52) U.S. Cl.
USPC .......................................... 712/218; 712/208
(58) Field of Classification Search
USPC .................. 712/221, 223, 225, 208, 218, 233
See application file for complete search history.

(56) References Cited

U.S. PATENT DOCUMENTS

| | | | | |
|---|---|---|---|---|
| 4,908,748 A | * | 3/1990 | Pathak et al. | 711/220 |
| 6,539,471 B2 | * | 3/2003 | Sheaffer | 712/217 |
| 2002/0144095 A1 | * | 10/2002 | Burch | 712/218 |
| 2007/0074006 A1 | * | 3/2007 | Martinez et al. | 712/218 |
| 2010/0131742 A1 | * | 5/2010 | Col et al. | 712/220 |

OTHER PUBLICATIONS

Mishra et al., "A Study of Out-of-Order Completion for the MIPS R10K Superscalar Processor", Jan. 2001, Dept. of Information and Computer Science, University of California, Irvine Technical Report #01-06, pp. 1-13.*

* cited by examiner

*Primary Examiner* — Robert Fennema
*Assistant Examiner* — Yuqing Xiao
(74) *Attorney, Agent, or Firm* — Park, Vaughan, Fleming & Dowler, LLP

(57) ABSTRACT

Methods and apparatuses are provided for increased efficiency in a processor via early instruction completion. An apparatus is provided for increased efficiency in a processor via early instruction completion. The apparatus comprises an execution unit for processing instructions and determining whether a later issued instruction is ready for completion or an earlier issued instruction is ready for completion and a retire unit for retiring the later issued instruction when the later instruction is ready for completion or to retire the earlier instruction when later instruction is not ready for completion and the earlier issued instruction has a known good completion status. A method is provided for increased efficiency in a processor via early instruction completion. The method comprises completing an earlier issued instruction having a known good completion status ahead of a later issued instruction when the later issued instruction is not ready for completion.

15 Claims, 4 Drawing Sheets

PROCESSOR WITH INCREASED EFFICIENCY VIA EARLY INSTRUCTION COMPLETION

TECHNICAL FIELD

The subject matter presented here relates to the field of information or data processors. More specifically, this invention relates to the field of processor efficiency enhancements by completing earlier scheduled instructions that are ready to retire ahead of later scheduled instructions where the completion status is unknown.

BACKGROUND

Superscalar processors achieve higher performance by executing multiple instructions concurrently and out-of-order. That is, instructions can be (and often are) processed out of the order that the instructions were placed into an execution pipeline. Notwithstanding contemporary out-of-order processing, conventional processors hold instructions (including completed instructions) in the execution pipeline and retire the instructions serially from the oldest instruction in the pipeline. This practice is wasteful of resources since all resources used by an instruction are held until the instruction is retired.

BRIEF SUMMARY OF THE EMBODIMENTS

An apparatus is provided for increased efficiency in a processor via early instruction completion. The apparatus comprises an execution unit for processing instructions and determining whether a later issued instruction is ready for completion or an earlier issued instruction is ready for completion and a retire unit for retiring the later instruction when the later instruction is ready for completion or to retire the earlier instruction when later instruction is not ready for completion and the earlier instruction is ready for completion.

A method is provided for increased efficiency in a processor via early instruction completion. The method comprises retiring an earlier issued instruction ready for completion ahead of a later issued instruction when the later instruction is not ready for completion.

BRIEF DESCRIPTION OF THE DRAWINGS

Embodiments of the present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. Moreover, as used herein, the word "processor" encompasses any type of information or data processor, including, without limitation, Internet access processors, Intranet access processors, personal data processors, military data processors, financial data processors, navigational processors, voice processors, music processors, video processors or any multimedia processors. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, the following detailed description or for any particular processor microarchitecture.

Figure 1:
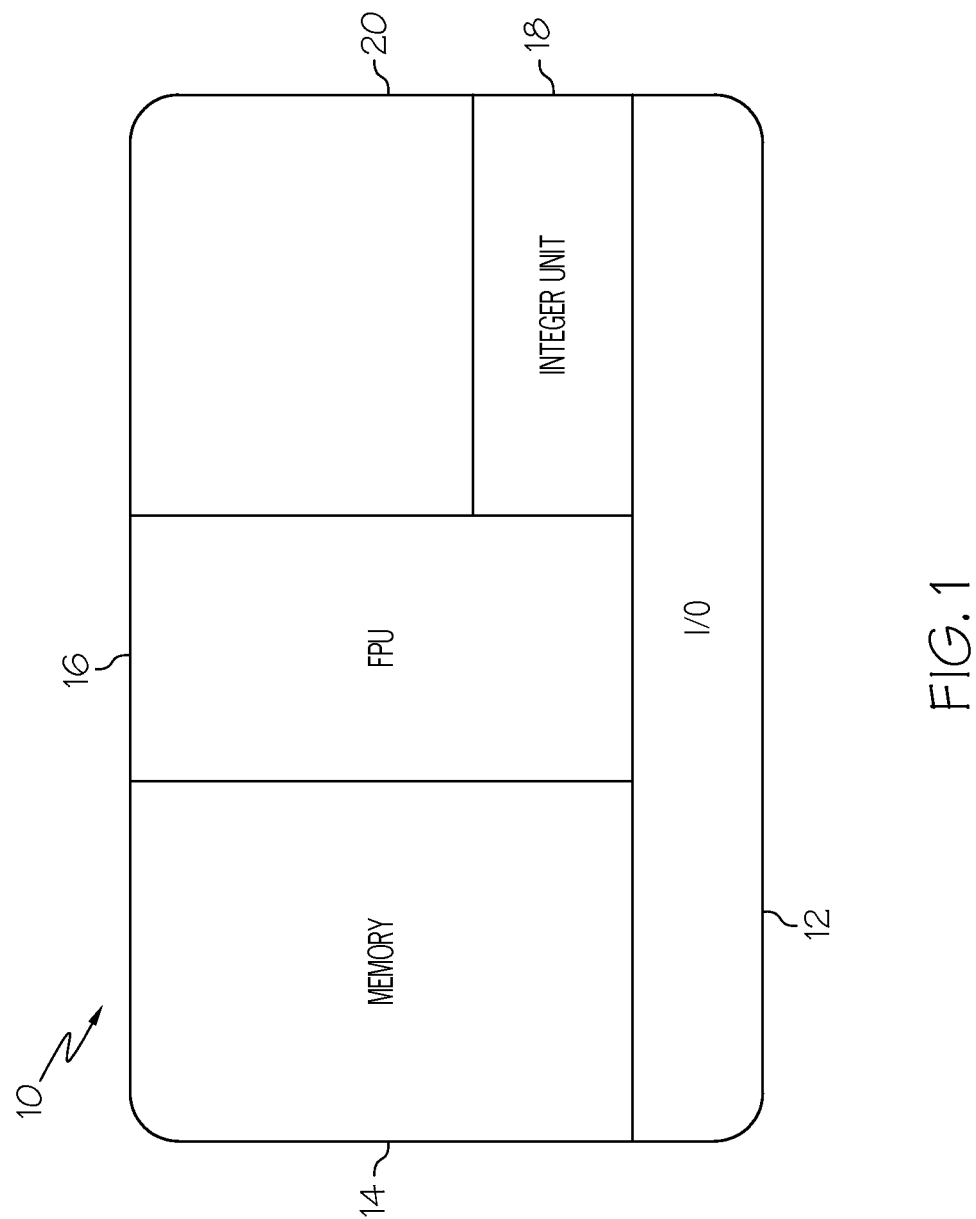
FIG. 1 is a simplified exemplary block diagram of processor suitable for use with the embodiments of the present disclosure.

Referring now to FIG. 1, a simplified exemplary block diagram is shown illustrating a processor 10 suitable for use with the embodiments of the present disclosure. In some embodiments, the processor 10 would be realized as a single core in a large-scale integrated circuit (LSIC). In other embodiments, the processor 10 could be one of a dual or multiple core LSIC to provide additional functionality in a single LSIC package. As is typical, processor 10 includes an input/output (I/O) section 12 and a memory section 14. The memory 14 can be any type of suitable memory. This would include the various types of dynamic random access memory (DRAM) such as SDRAM, the various types of static RAM (SRAM), and the various types of non-volatile memory (PROM, EPROM, and flash). In certain embodiments, additional memory (not shown) "off chip" of the processor 10 can be accessed via the I/O section 12. The processor 10 may also include a floating-point unit (FPU) 16 that performs the float-point computations of the processor 10 and an integer processing unit 18 for performing integer computations. Within a processor, numerical data is typically expressed using integer or floating-point representation. Mathematical computations within a processor are generally performed in computational units designed for maximum efficiency for each computation. Thus, it is common for processor architecture to have an integer computational unit and a floating-point computational unit. Additionally, various other types of units (generally 20) as desired for any particular processor microarchitecture may be included.

Figure 2:
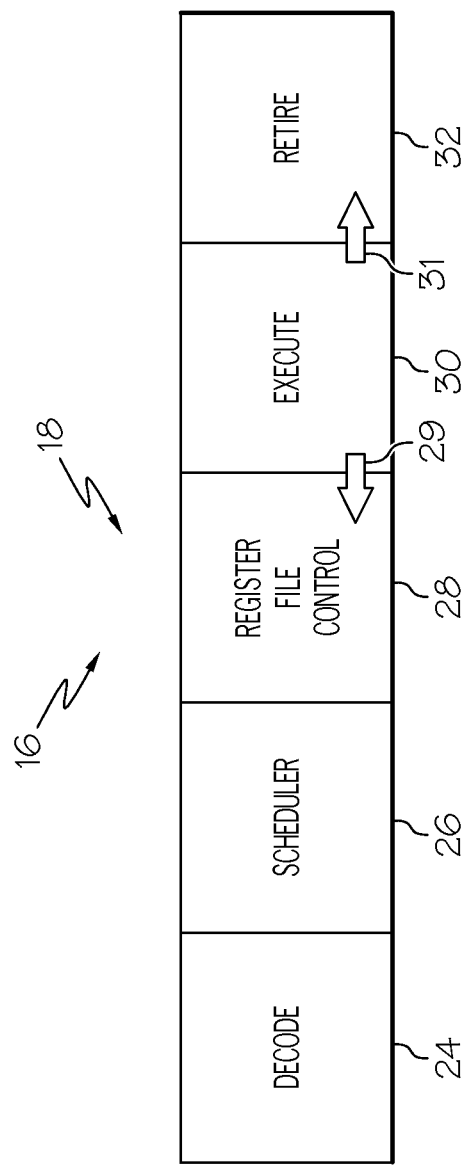
FIG. 2 is a simplified exemplary block diagram of an operational (e.g., floating-point or integer) unit suitable for use with the processor of FIG. 1.

Referring now to FIG. 2, a simplified exemplary block diagram of an operational unit suitable for use with the processor 10 is shown. In one embodiment, FIG. 2 could operate as the floating-point unit 16, while in other embodiments FIG. 2 could illustrate the integer unit 18.

In operation, the decode unit 24 decodes the incoming instructions or operation-codes (opcodes) dispatched (or fetched by) an operational unit. The decode unit 24 is responsible for the general decoding of instructions (e.g., x86 instructions and extensions thereof) and providing decoded instructions to be scheduled for processing and exeuction.

The scheduler 26 contains a scheduler queue and associated issue logic. As its name implies, the scheduler 26 is responsible for determining which opcodes are passed to execution units and in what order. In one embodiment, the scheduler 26 accepts opcodes from decode unit 24 and stores them in the scheduler 26 until they are eligible to be selected by the scheduler to issue to one of the execution pipes.

The register file control 28 holds the physical registers. The physical register numbers and their associated valid bits arrive from the scheduler 26. Source operands are read out of the physical registers and results written back into the physical registers. In a multi-pipelined (super-scalar) architecture, an opcode (with any data) would be issued for each execution pipe.

The execute unites) 30 may be embodied as any general purpose or specialized execution architecture as desired for a particular processor. In one embodiment the execution unit may be realized as a single instruction multiple data (SIMD) arithmetic logic unit (ALU). In other embodiments, dual or multiple SIMD ALUs could be employed for super-scalar and/or multi-threaded embodiments, which operate to produce results and any exception bits generated during execution. After an opcode has been executed, results are returned (via results bus 29) to the register file control unit 28 for storage, while the completed opcodes are forwarded (via completion bus 31) to the retire unit 32.

In one embodiment, after an opcode has been executed (i.e., the completion status is known), the instruction can be processed by the retire unit 32 so that the resources (e.g., physical registers) used by that instruction can be returned to the free list and made available for use by other instructions. Completion status can be good or bad. The retire unit 32 cannot retire an opcode with a bad completion status (e.g., a branch mis-prediction occurred or a divide by zero operation was attempted). Instead, the retire unit 32 must handle the exception by flushing all younger opcodes, and returning the execution pipline to a non-speculative state prior to whatever caused the bad completion status. The retire unit 32 performs these operation by maintaining a list of all opcodes in process in the execution unit(s) 30 and is responsible for committing all the floating-point unit 16 or integer unit 18 architectural states upon retirement of an opcode.

Figure 3:
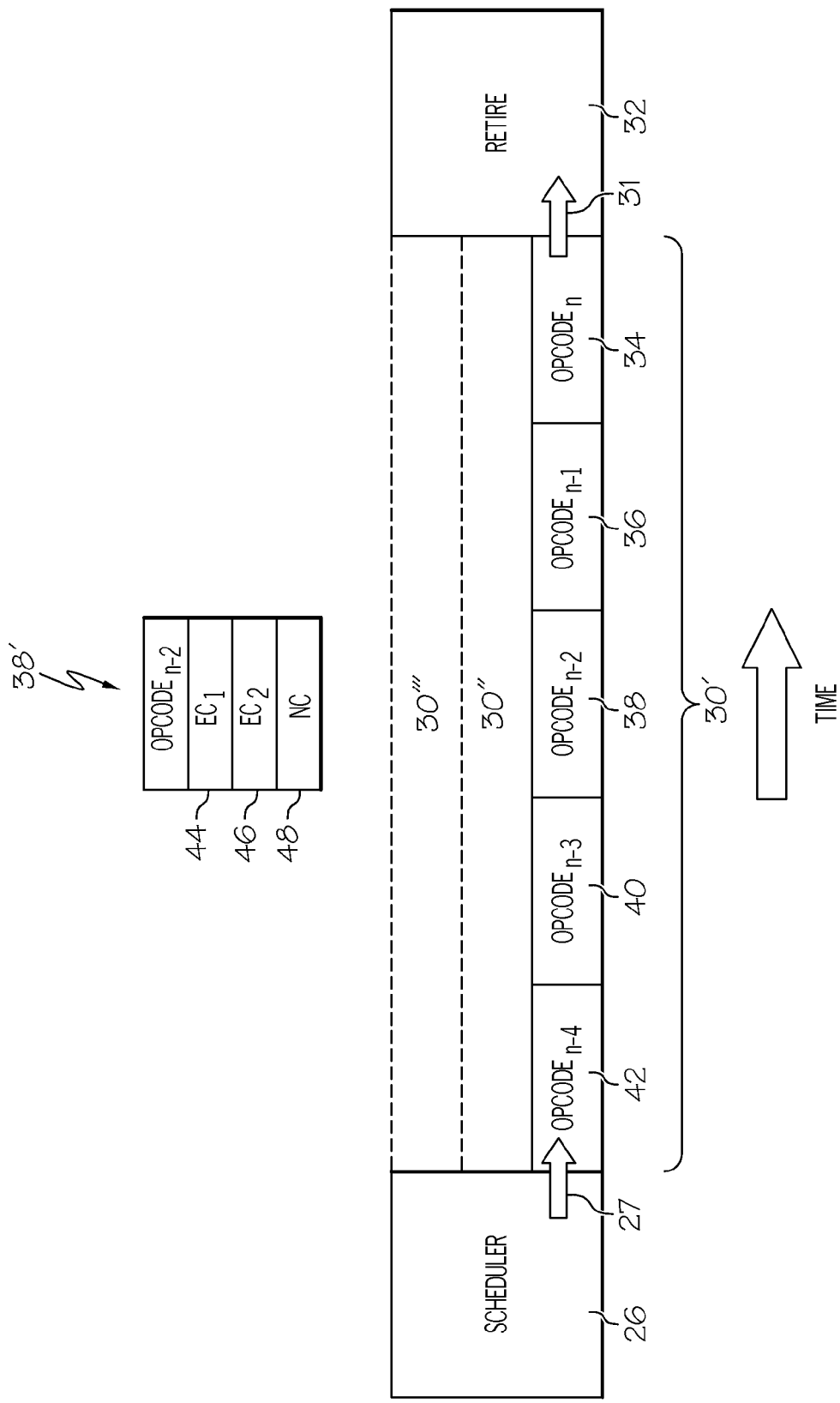
FIG. 3 is a simplified exemplary block diagram of an execution unit suitable for use with the operational unit of FIG. 2.

Referring now to FIG. 3, an illustration of an execution pipeline 30' is shown. In some embodiments, a multi-pipelined architecture is utilized, meaning that other execution pipelines (30" and 30''') operate in parallel an independently of pipeline 30'. In the illustrated example, five instructions 34-42 are in progress in the execution pipeline 30'. Each instruction was picked for execution by the scheduler unit 26 and placed or inserted into the execution pipeline via instruction bus 27. After processing to completion, each instruction will be forwarded to the retire unit 32 via the completion bus 31. Instruction 34 ($Opcode_n$) is the oldest instruction in the execution pipeline (note time arrow reference in FIG. 3) and upon completion, instruction 34 will pass from the execution pipeline 30' to the retire unit 32 via the completion bus 31. However, the present disclosure contemplates that one or more of the earlier issued instructions 36-42 may be processed out-of-order, and thus, be in various stages of completion while instruction 34 is being processed to completion. That is, an earlier (in time) issued instruction may have a known good completion status while later issued instructions are still being processed.

In conventional processors, all instructions are completed serially in the order the instructions were inserted into the execution pipeline. This assures a known completion status (e.g., exceptions, traps and faults) prior to retirement. However, the present disclosure contemplates that the completion status for many common instructions may be determined early (i.e., prior to normal completion) based upon flags and exception masks known at instruction pick time (in the scheduler unit 26) or based upon the input data for the instruction (also known at pick time). That is, the present disclosure recognizes that the instructions issued into the execution pipeline 30' have multiple and different latencies and may complete out-of-order due to the out-of-order processing. By determining when an instruction may complete early (that is, ahead of a later (older) instruction), the present disclosure provides early instruction completion by forwarding instructions having a known good completion status out of the execution pipeline to the retire unit 32 ahead of later instructions for which the completion status is not yet known. This increases efficiency by having completed instructions in queue in the retire unit 32 waiting for retirement, which in turn releases resources earlier than having all instructions wait its turn for normal retirement.

In the example illustrated in FIG. 3, consider that instruction 38 ($Opcode_{n-2}$) is determined to be capable of early completion. In one embodiment, this determination can be made in the decode unit (24 of FIG. 2) by comparing the decoded instruction to a lookup table of instructions known to be capable of early completion. In another embodiment, the determination can be made in the scheduler unit 26 based upon flags and exception masks associated with the instruction, or by a function of the input data accompanying the instruction. Once an instruction is known to be capable of early completion, a first-in-first-out (FIFO) table 38' is created storing the possible or potential early completion (EC) times, such as illustrated at 44 and 46. The last entry in the FIFO 38' is the normal completion (NC) time 48 of instruction 38.

In operation, the oldest issued instruction ($Opcode_n$ in this example) is checked for completion. If it has completed, the instruction is placed onto the completion bus 31 since the oldest instruction must be given next available slot on the completion bus and retire or be lost. However, if the oldest issued instruction has not completed, the present disclosure checks the earlier issued instructions to determine if any have completed (that is, their completion status can be known in advance and the completion status is known to be good). In the illustrated example, consider that instruction 36 ($Opcode_{n-1}$) was determined not to be capable of early completion, and thus, it does not have an associated FIFO of potential early completion times. However, instruction 38 ($Opcode_{n-2}$) is capable of early completion and it would be determined whether one of the possible early completion times (44 or 46) has occurred and the completion status is known to be good. If so, and if there were an open slot on the completion bus 31, instruction 38 would be placed onto the completion bus 31 early and out-of-order, opening a slot in the execution pipeline 30' and placing instruction 38 in queue for retirement providing faster release of resources for use by other instructions. That is, the completion bus is checked for an open slot for the avoidance of collisions or bus hazards. If an open slot is not available on the completion bus, an earlier instruction with a known good completion status ($Opcode_{n-2}$ in this example) would wait for the next opportunity for early completion, and may ultimately wait for normal completion and retirement rather than risk bus hazards and errors. In one embodiment, the execution unit looks back three instructions from the oldest instruction 34 (that is, through instruction 40), however, in other embodiments any number of earlier instructions could be investigated for early completion.

As an example, and not a limitation, SSE packed integer instructions such as ANDPD (logical AND of a packed-double word) can have a completion status determined as soon as they are placed into the execution pipeline (30'). Also, SSE packed floating point instructions such as ADDPD (add a packed-double word) can be ready for early completion after checking the input data for exceptional cases that could cause a bad completion status.

Figure 4:
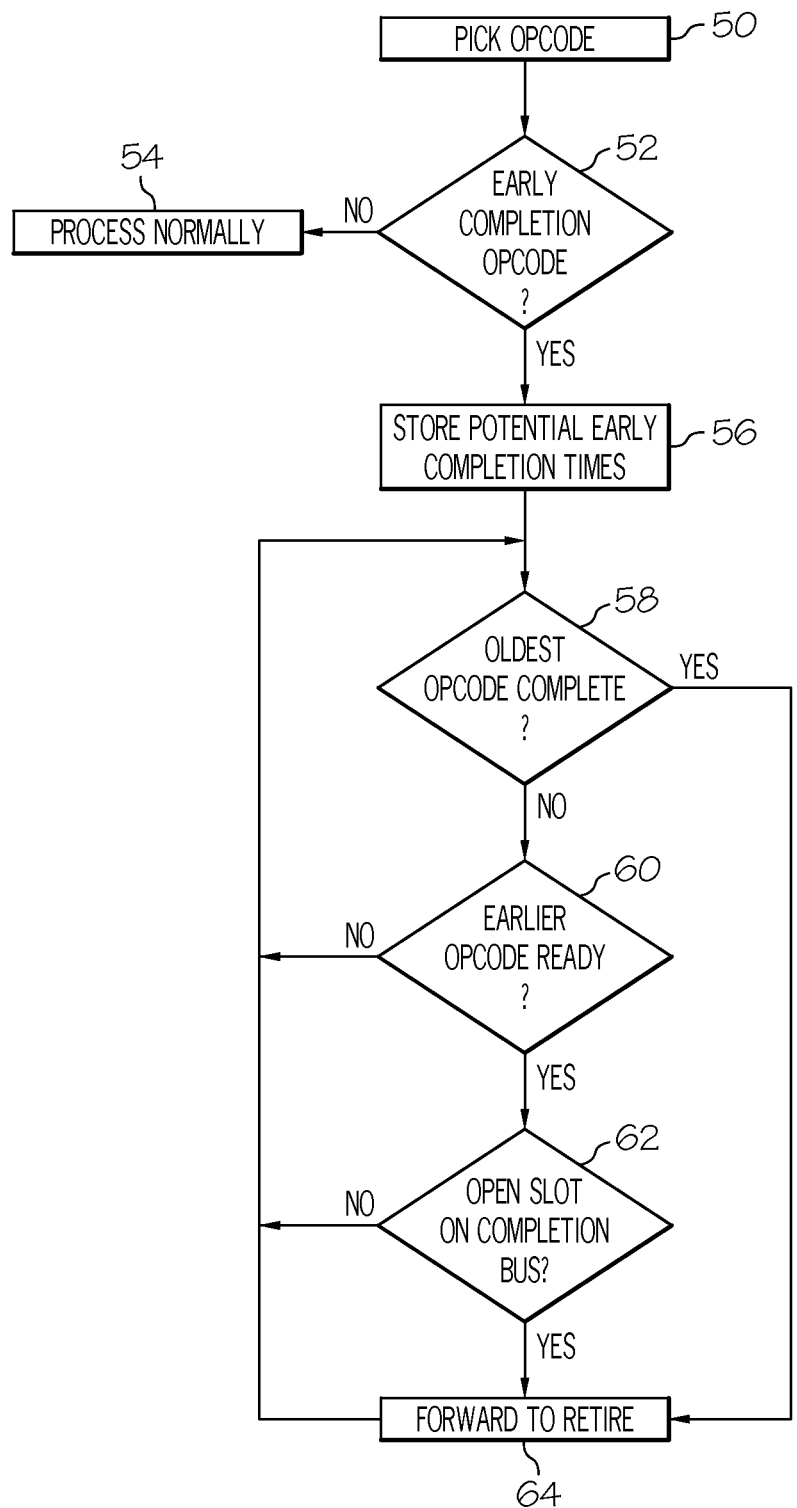
FIG. 4 is an exemplary flow diagram illustrating a method according to an embodiment of the present disclosure.

Referring now to FIG. 4, an illustration of an exemplary flow diagram illustrating the method of an embodiment for processing instructions for early completion is shown. The various tasks performed in connection with the process of FIG. 4 may be performed by software, hardware, firmware, or any combination thereof. For illustrative purposes, the following description of the process of FIG. 4 may refer to elements mentioned above in connection with FIGS. 1-3. In practice, portions of the process of FIG. 4 may be performed by different elements of the described system. It should also be appreciated that the process of FIG. 4 may include any number of additional or alternative tasks and that the process of FIG. 4 may be incorporated into a more comprehensive procedure or process having additional functionality not described in detail herein. Moreover, one or more of the tasks shown in FIG. 4 could be omitted from an embodiment of the process of FIG. 4 as long as the intended overall functionality remains intact.

Beginning in step 50, an instruction is picked (for example in scheduler unit 24 of FIG. 2) for placement or insertion into an execution pipeline (30' of FIG. 3). Next decision 52 determines if the instruction is capable of early completion such as by comparing to a table by flag and exception masks, by input data associated with the instruction or any other convenient means. If the determination of decision 52 is that the decoded instruction is not capable of early completion, the instruction is processed normally (step 54) including normal instruction retirement. Conversely, if the determination of decision 52 is that the instruction is capable of early completion, the method stores potential early completion times (step 56) such as illustrated in FIFO 38' of FIG. 3.

According to the embodiments of the present disclosure, the potential for early completion commences by checking whether the oldest issued instruction (opcode) is ready for completion (decision 58). If, the determination of decision 58 is that the oldest issued instruction (opcode) is ready for completion, it is forwarded (step 64) to the retire unit (32 of FIG. 3) even though some earlier issued instructions may also be ready for completion. However, if the determination of decision 58 is that oldest instruction is not ready for completion, then one or more of the earlier issued opcodes are checked to determine if they are ready for completion (decision 60) and have a known good completion status. If so, then decision 62 determines whether there is an open slot on the completion bus (31 in FIG. 3) for the avoidance of bus hazards. If so, then the earlier issued instruction is forwarded to the retire unit early (and out-of-order) in step 64 and the routine returns to recheck the oldest instruction to determine if it is now ready for completion. Conversely, if the determination of either decision 60 or decision 62 is negative the routine also loops back to again check the oldest issued opcode for its ready for completion status. In this way, earlier ready for completion (i.e., having a known good completion status) instructions may be forwarded out of the execution pipeline ahead of later or older instructions, which opens a slot in the execution pipeline (30' of FIG. 3) sooner than normal instruction completion and also queues instruction for release of resources earlier than would occur if all instructions waited for normal retirement. The processor of the embodiments of the present disclosure are thus more efficient than conventional processors of the past.

Various processor-based devices that may advantageously use the processor (or any computational unit) of the present disclosure include, but are not limited to, laptop computers, digital books or readers, printers, scanners, standard or high-definition televisions or monitors and standard or high-definition set-top boxes for satellite or cable programming reception. In each example, any other circuitry necessary for the implementation of the processor-based device would be added by the respective manufacturer. The above listing of processor-based devices is merely exemplary and not intended to be a limitation on the number or types of processor-based devices that may advantageously use the processor (or any computational) unit of the present disclosure.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

What is claimed is:

1. A method, comprising:
    determining one or more early completion times for instructions that are capable of early completion and creating a separate first-in-first-out (FIFO) table for each of the instructions, the FIFO table comprising the one or more early completion times for the corresponding instruction;
    forwarding an earlier issued instruction having a known good completion status out of an execution pipeline of a processor ahead of a later issued instruction having an unknown completion status when at least one of the early completion times from the FIFO table for the earlier issued instruction has occurred.

2. The method of claim 1, wherein forwarding further comprises moving the earlier issued instruction to a retire unit of the processor ahead of the later issued instruction when the completion status of the later issued instruction is unknown and there is an open slot on a completion bus.

3. The method of claim 1, further comprising storing results produced by the earlier issued instruction prior to forwarding the instruction.

4. The method of claim 1, further comprising releasing resources used by the earlier issued instruction after retiring the earlier instruction.

5. A method, comprising:
    determining one or more early completion times for instructions that are capable of early completion and creating a separate first-in-first-out (FIFO) table for each of the instructions, the FIFO table comprising the one or more early completion times for the corresponding instruction;
    determining whether a later issued instruction in an execution pipeline of a processor is ready for completion;
    determining that an earlier issued instruction in the execution pipeline of the processor has a known good completion status and that at least one of the earlier completion times from the FIFO table for the earlier issued instruction has occurred; and
    forwarding the earlier issued instruction out of the execution pipeline of the processor when the later issued instruction is not ready for completion.

6. The method of claim 5, which includes forwarding the later issued instruction to a retire unit of the processor when the later issued instruction is ready for completion.

7. The method of claim 5, further comprising storing results produced by the earlier issued instruction prior to forwarding the earlier instruction.

8. The method of claim 5, further comprising releasing resources used by the earlier issued instruction after retiring the earlier instruction.

9. A method, comprising:
- determining one or more early completion times for instructions that are capable of early completion and creating a separate first-in-first-out (FIFO) table for each of the instructions, the FIFO table comprising the one or more early completion times for the corresponding instruction;
- determining whether an oldest issued instruction in an execution pipeline of a processor is ready for completion;
- determining that one or more earlier issued instructions in the execution pipeline are ready for completion and that at least one of the earlier completion times from the FIFO table for the earlier issued instruction has occurred; and
- forwarding the latest of the one or more earlier issued instructions ready for completion to a retire unit of the processor when the oldest issued instruction is not ready for completion.

10. The method of claim 9, further comprising storing results produced by the latest of the one or more earlier issued instructions prior to forwarding the latest of the one or more earlier issued instructions.

11. The method of claim 9, further comprising releasing resources used by the latest of the one or more earlier issued instructions after retiring the latest of the one or more earlier issued instructions.

12. A processor, comprising:
- a decode unit and a scheduler unit, one or more of the decode unit and the scheduler unit being configured to determine one or more early completion times for instructions that are capable of early completion and create a separate first-in-first-out (FIFO) table for each of the instructions, the FIFO table comprising the one or more early completion times for the corresponding instruction;
- an execution unit for processing instructions, the execution unit being configured to determine whether a later issued instruction is ready for completion and to determine when an earlier issued instruction is ready for completion; and
- a retire unit for receiving the later issued instruction when the later instruction is ready for completion or for receiving the earlier issued instruction when later issued instruction is not ready for completion and the earlier issued instruction has a known good completion status and at least one of the earlier completion times from the FIFO table for the earlier issued instruction has occurred.

13. The processor of claim 12, wherein the execution unit returns result produced by the earlier issued instruction prior to passing the earlier instruction to the retire unit.

14. The processor of claim 12, wherein the retire unit releases resources used by the earlier issued instruction.

15. A device comprising the processor of claim 12, the device comprising at least one of a group consisting of: a computer; a digital book; a printer; a scanner; a television; or a set-top box.

* * * * *